(12) United States Patent
Kalepu et al.

(10) Patent No.: US 10,193,939 B2
(45) Date of Patent: *Jan. 29, 2019

(54) SPI HANDLING BETWEEN UE AND P-CSCF IN AN IMS NETWORK

(71) Applicant: T-Mobile USA, Inc., Bellevue, WA (US)

(72) Inventors: Kalyan Kalepu, Sammamish, WA (US); Shujaur Mufti, Snoqualmie, WA (US)

(73) Assignee: T-Mobile U.S.A., Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,822

(22) Filed: Aug. 7, 2017

(65) Prior Publication Data

US 2017/0339197 A1 Nov. 23, 2017

Related U.S. Application Data

(63) Continuation of application No. 14/729,025, filed on Jun. 2, 2015, now Pat. No. 9,729,588.
(Continued)

(51) Int. Cl.
*H04W 4/00* (2018.01)
*H04J 1/00* (2006.01)
(Continued)

(52) U.S. Cl.
CPC ............ *H04L 65/40* (2013.01); *H04L 63/108* (2013.01); *H04L 63/205* (2013.01);
(Continued)

(58) Field of Classification Search
CPC . H04L 65/40; H04L 65/1016; H04L 65/1073; H04L 63/108; H04L 63/205; H04W 12/08
(Continued)

(56) References Cited

U.S. PATENT DOCUMENTS 8,924,718 B2 * 12/2014 Janakiraman ......... H04L 63/306
713/160
9,166,799 B2 10/2015 Kim
(Continued)

FOREIGN PATENT DOCUMENTS

CN 1650569 A 8/2005
CN 1706207 A 12/2005
(Continued)

OTHER PUBLICATIONS

3GPP TS 24.229 V12.6.0 3rd Generation Partnership Project; Technical Specification Group Core Network and Terminals; IP multimedia call control protocol based on SIP and SDP; Stage 3 (Release 12); Sep. 2014, 844 pages.
(Continued)

*Primary Examiner* — Thai D Hoang
(74) *Attorney, Agent, or Firm* — Perkins Coie LLP

(57) ABSTRACT

Managing Security Parameter Information (SPIs) to prevent race condition failures begins where a system negotiates SPIs along with associated expiration times, and re-negotiates new SPIs as necessary. The system prevents race conditions that would otherwise occur when both an old SPI and a new SPI are active at the same time. The system accomplishes this by managing the storage and deletion of old SPIs such that only active SPIs are stored on the system for use by a User Equipment (UE) or Proxy Call Session Control Function (P-CSCF).

21 Claims, 3 Drawing Sheets

Related U.S. Application Data

(60) Provisional application No. 62/073,866, filed on Oct. 31, 2014.

(51) Int. Cl.
*H04L 29/06* (2006.01)
*H04W 12/08* (2009.01)

(52) U.S. Cl.
CPC ...... *H04L 65/1016* (2013.01); *H04L 65/1073* (2013.01); *H04L 65/4007* (2013.01); *H04W 12/08* (2013.01)

(58) Field of Classification Search
USPC .... 455/435.1–435.3, 432.1–432.3, 433–434; 370/342–347, 449–457
See application file for complete search history.

(56) References Cited

U.S. PATENT DOCUMENTS

| | | | |
|---|---|---|---|
| 9,729,588 | B2 | 8/2017 | Kalepu et al. |
| 2008/0010688 | A1 | 1/2008 | Cai et al. |
| 2008/0069050 | A1* | 3/2008 | Dutta ............... H04W 36/0038 370/331 |
| 2008/0295168 | A1 | 11/2008 | Bajko et al. |
| 2009/0276532 | A1 | 11/2009 | Bishop et al. |
| 2009/0327721 | A1* | 12/2009 | Arkko ............... H04L 63/0428 713/168 |
| 2012/0142350 | A1 | 6/2012 | Coulas et al. |
| 2013/0136058 | A1 | 5/2013 | Keller et al. |
| 2015/0093996 | A1 | 4/2015 | Ghaboosi et al. |

FOREIGN PATENT DOCUMENTS

| | | |
|---|---|---|
| CN | 102006294 A | 4/2011 |
| WO | 2014084596 A1 | 6/2014 |
| WO | 2016070143 A2 | 5/2016 |

OTHER PUBLICATIONS

International Searching Authority, International Search Report and Written Opinion, PCT Patent Application PCT/US2015/058496, dated Apr. 22, 2016, 12 pages.

State Intellectual Property Office of China, First Office Action, CN Patent Application 201580071903.1, dated Apr. 4, 2018, 15 pages, includes English translation.

ETSI Technical Specification, "Digital cellular telecommunications system (Phase 2+)," 3GPP TS 33.203 version 12.7.0 release 12. Oct. 1, 2014, 141 pages.

European Patent Office, Extended European Search Report, EP Patent Application 15855503.7, dated May 17, 2018, 9 pages.

3rd Generation Partnership Project, 3GPP TS 33.203 v12.7.0, Technical Specification, "3G security; Access security for IP-based services", Release Sep. 30, 2014, 134 pages.

State Intellectual Property Office of China, Second Office Action, CN Patent Application 201580071903.1, dated Sep. 20, 2018, 17 pages, includes English translation.

* cited by examiner

SPI HANDLING BETWEEN UE AND P-CSCF IN AN IMS NETWORK

CROSS-REFERENCES TO RELATED APPLICATIONS

This application is a continuation of U.S. patent application Ser. No. 14/729,025, entitled SPI HANDLING BETWEEN UE AND P-CSCF IN AN IMS NETWORK, filed Jun. 2, 2015, now U.S. Pat. No. 9,729,588; which claims the benefit of U.S. Provisional Application No. 62/073,866, entitled SPI HANDLING BETWEEN UE AND P-CSCF IN AN IMS NETWORK, filed Oct. 31, 2014, the entireties of which are hereby incorporated by reference.

BACKGROUND

The Internet Protocol Multimedia Subsystem ("IMS") is an architectural framework for delivering Internet Protocol ("IP") multimedia to mobile users, such as users of smart phones or tablet computers. An IMS core network ("IMS core") permits wireless and wireline devices to access multimedia, messaging, and voice applications and services. IMS standards and specifications have been promulgated by the 3rd Generation Partnership Project ("3GPP"™). To allow the IMS core to be integrated with Internet resources, the 3GPP specifications use Internet Engineering Task Force protocols within the IMS core, such as Session Initiation Protocol ("SIP") and Diameter. SIP is a signaling protocol used for creating, modifying and terminating two-party or multiparty sessions consisting of one or several media streams. A mobile device registers its IP address with a SIP registrar server within an IMS core by generating and sending a SIP request message with a "REGISTER" method token. Once registered, a mobile device may subsequently establish multimedia sessions via the IMS core.

An IMS client (or IMS stack) software component on a mobile device allows one or more applications on the mobile device to register for various application services that are available on the IMS network, such as Voice over LTE (VoLTE), Rich Communication Services (RCS), Short Message Service over Internet Protocol (SMS over IP), and Presence. If the registration is successful, the mobile device application may then take advantage of the functionality offered by the application service to which it is registered. If the registration is unsuccessful, however, then the application will be unable to take advantage of the offered functionality.

During registration for VoLTE, for example, Security Parameter Information (SPIs) is negotiated along with associated expiration times. To enable continuing access to services after an expiration time, the network is required to negotiate new SPIs for use after an old SPI expires, as set forth in 3GPP specification 24.299, which is herein incorporated by reference in its entirety. However, in some instances, a race condition may occur when both an old SPI and a new SPI are active at the same time. Such race conditions, which are not addressed in current versions of the 3GPP specifications, may result in failed registrations for requested services. These failed services have an adverse impact on the performance of the network and are a source of frustration for end users who are unable to access desired services. These and other problems exist within the current IMS architecture.

DETAILED DESCRIPTION

The disclosed technology relates to a method and system for Security Parameter Information (SPI) handling between a User Equipment (UE) and Proxy Call Session Control Function (P-CSCF) to avoid race condition failures, among other benefits. A communications device user, who is a subscriber on the IMS, registers with the IMS, and a services gateway in the IMS then verifies the user's registration with the IMS. When the user wants to access an online application program, or make/receive a phone call, a program or browser running on the communication device generates an HTTP request to a P-CSCF on the IMS. The request includes a security association (SA). Once the requested SA is successfully negotiated between the UE and the P-CSCF, the presence of the SA serves to validate the user such that communication can occur between the UE and the P-CSCF in a secure fashion. The negotiated SA may be stored in the UE and/or P-CSCF, and either or both of the UE and P-CSCF may calculate an expiration date for the SA such that when the SA expires, the user will have to obtain a new or renewed SA. In some instances, the system may obtain a new SA pair before the old SA pair has expired. In order to prevent race conditions—i.e., conditions where a request is improperly rejected because the request uses an old SA rather than a new SA—the system deletes the old SA when a new SA is generated, as explained in greater detail below.

Various embodiments of the disclosed technology will now be described. The following description provides specific details for a thorough understanding and an enabling description of these embodiments. One skilled in the art will understand, however, that the disclosed technology may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the technology.

Figure 1:
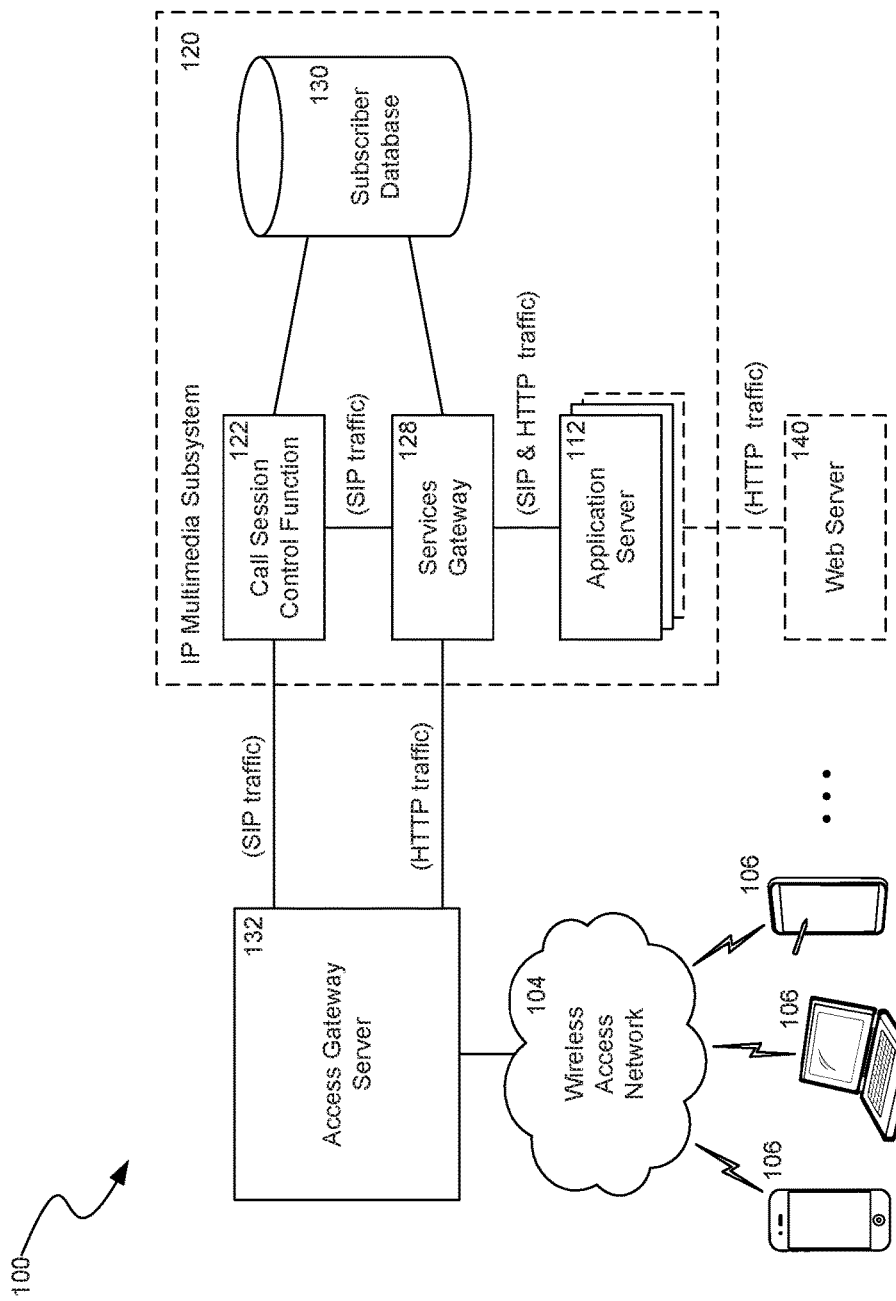
FIG. 1 is a block diagram that illustrates an exemplary system 100 in which SPI handling between a UE and P-CSCF is coordinated to avoid race condition failures.

FIG. 1 is a block diagram that illustrates an exemplary system 100 in which SPI handling between a UE and P-CSCF is coordinated to avoid race condition failures. A communications device 106, such a mobile phone, tablet computer, laptop, wearable computer, vehicle-mounted computer, PDA or the like, is connected via a wireless access network 104, to an access gateway server 132. In some embodiments, a large number of communications devices 106 may be supported on the wireless access network 104.

The connection across the wireless access network 104 is Internet Protocol (IP)-based, permitting the delivery of Session Initiation Protocol network traffic as well as HTTP network traffic. The access gateway server 132 is connected to an IP Multimedia Subsystem 120. SIP traffic flows between the access gateway server 132 and one or more Call Session Control Function servers 122, which are located within the IMS 120. Additional details of the IMS 120, including the Call Session Control Function servers 122, may be found in the Applicant's U.S. Pat. No. 8,762,559, entitled "System and Method for Non-IMS Application Service Access Over IP Multimedia Subsystem," the content of which is herein incorporated by reference in its entirety. Various details are illustrated in a simplified manner herein for the sake of brevity; although a person having ordinary skill in the art will understand the details necessary for an implementation of the disclosed technology without undue experimentation.

The Call Session Control Function servers 122 are communicatively coupled with a subscriber database 130, which may be utilized during the IMS registration process for registering users and their communication devices with the IMS 120. Registration with the IMS may include verifying the user's identity, recording a device ID for their communication device(s) and checking the user's payment history. In addition, the subscriber database 130 may keep track of a list of security associations, or online applications that the user is allowed to access or that the user is not allowed to access.

Figure 2:
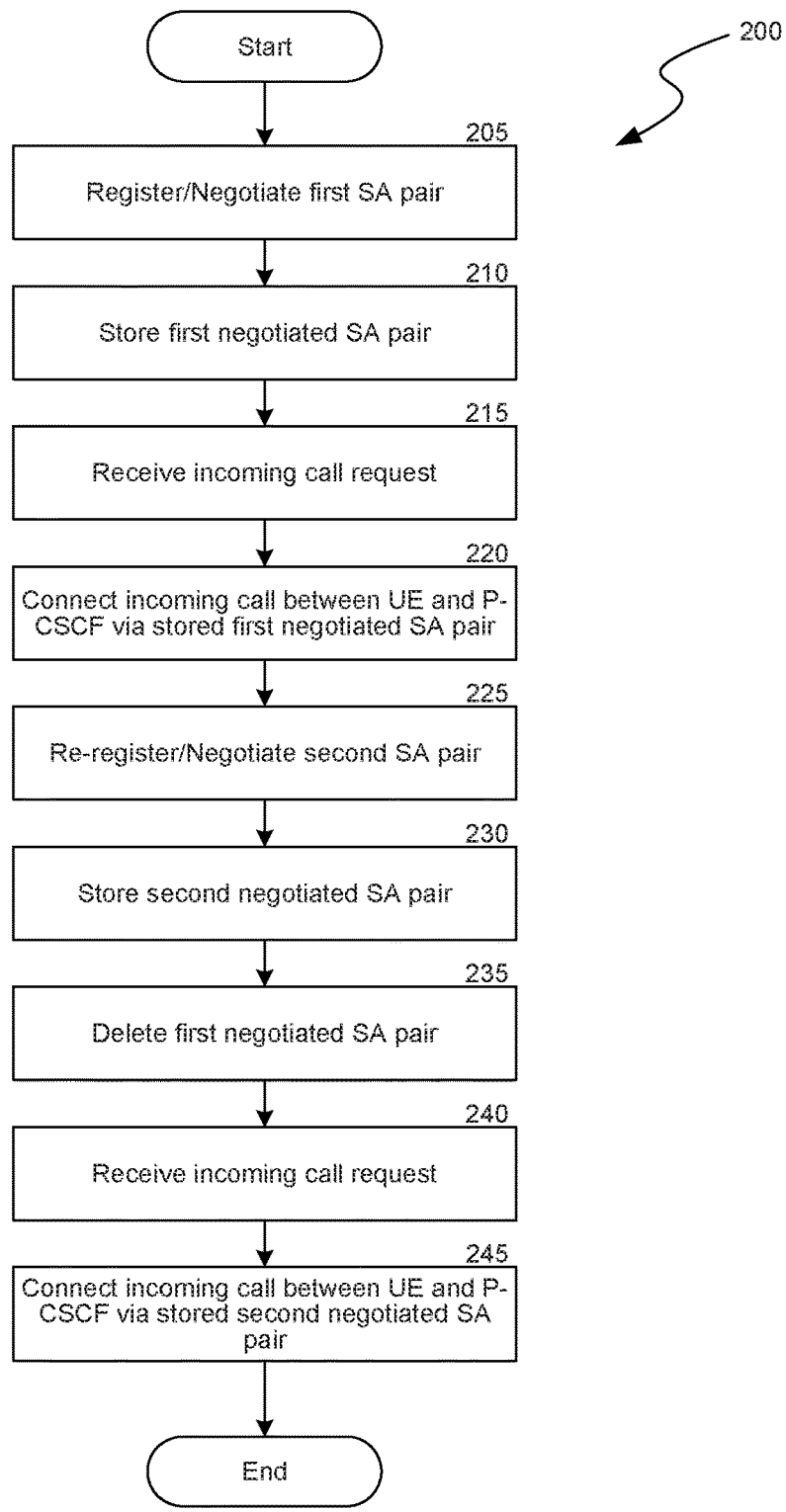
FIG. 2 is a flow diagram illustrating a simplified view of SPI handling between a UE and P-CSCF for an incoming call.

FIG. 2 is a flow diagram illustrating a simplified view of SPI handling between a UE and P-CSCF for an incoming call. At step 205, the UE registers with the telecommunications network and negotiates a first pair of security associations (SAs) that are used to protect communications between a UE and a P-CSCF. As explained in more detail with respect to FIG. 3, the system may calculate one or more expiration times for the negotiated SAs (e.g., at the UE, P-CSCF, or both) and may also calculate a re-registration time at which the UE will request a new SA pair. At step 210, the system stores the negotiated first pair of SAs. The negotiated first pair of SAs may be stored in the UE, in the P-CSCF, or in both the UE and the P-CSCF. In addition, the calculated re-registration time may be stored in the UE.

At step 215, the P-CSCF is notified of an incoming call destined for the UE. At step 220, the P-CSCF routes the incoming call to the UE using the stored negotiated first pair of SAs. At step 225, the UE re-registers with the IMS network and negotiates a second pair of SAs. As explained in more detail with respect to FIG. 3, the UE may re-register with the IMS network based on a previously calculated re-registration time. As before, the system may calculate one or more expiration times for the second negotiated SAs (e.g., at the UE, P-CSCF, or both) and may also calculate a re-registration time at which the UE will request a new (i.e., third) SA pair. At step 230, the system stores the negotiated second pair of SAs. The negotiated second pair of SAs may be stored in the UE, in the P-CSCF, or in both the UE and the P-CSCF. In addition, the calculated re-registration time may be stored in the UE. At step 235, the negotiated first pair of SAs is deleted in the P-CSCF. As explained in more detail below, by deleting the outdated SA pair, the system reduces the risk of communication failures due to the P-CSCF attempting to communicate with the UE via an expired SA pair rather than an active SA pair. At step 240, the P-CSCF is notified of an incoming call destined for the UE. At step 245, the P-CSCF routes the incoming call to the UE using the stored negotiated second pair of SAs. A person of ordinary skill in the art will appreciate that an SA pair may be deleted based on various criteria. For example, the system may delete an SA pair in response to an expiration time being reached, in response to a new SA pair being successfully negotiated, or based on an expiry time (and optionally a delta delay) that is received during registration or re-registration of the mobile device.

Figure 3:
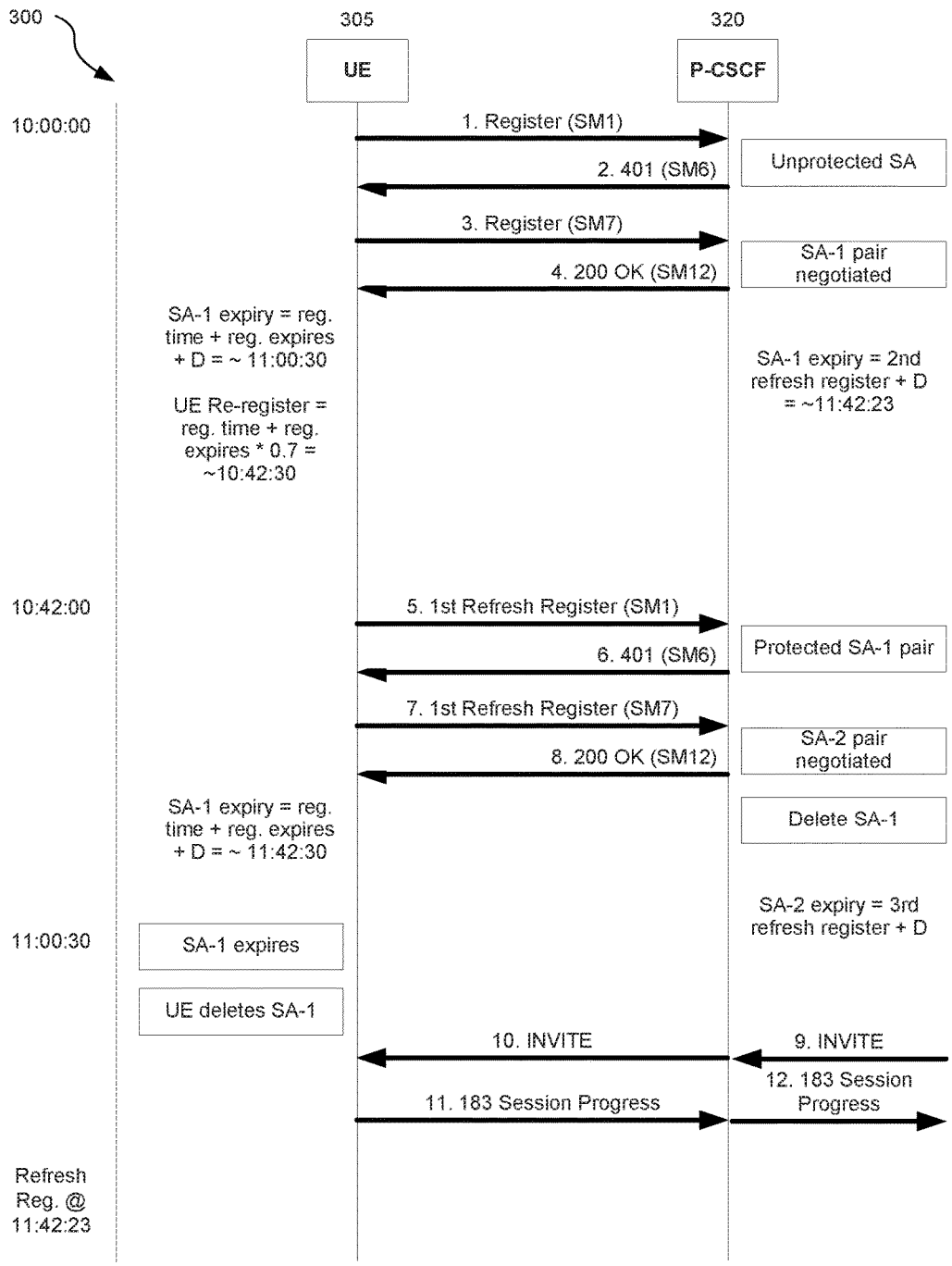
FIG. 3 is a call flow diagram illustrating an embodiment of SPI handling between a UE and P-CSCF for an incoming call.

FIG. 3 is a flow diagram illustrating an embodiment of SPI handling between a UE and P-CSCF for an incoming call. At step 1, UE 305 sends a SIP REGISTER request towards P-CSCF 310. At step 2, P-CSCF 310 sends an SIP 401 message towards UE 305 to challenge the initial registration request. Note that at steps 1 and 2, the communication between the UE 305 and P-CSCF 310 are unprotected. That is, the communications occur without an associated security association pair. At step 3, UE 305 sends another SIP REGISTER request towards P-CSCF 310, this time containing information corresponding to a security association pair (SA-1). At step 4, P-CSCF responds with a 200 OK message to confirm that the received security association pair (SA-1) has been successfully negotiated. The 200 OK message may additionally include an expiry time that may be specified in any number of ways, such as a number of minutes, a number of seconds, an actual time/date, an algorithmically determined time, a predetermined time selected from a lookup table, or any other method.

During or after the negotiation process that occurs at steps 3 and 4, the system may calculate an expiration time for the negotiated SA pair. The system may calculate and store an expiration time at the UE. Additionally or alternatively, the system may separately calculate and store an expiration time at the P-CSCF. At the UE side, for example, the system may calculate an expiration time that offsets a registration time (e.g., a time that the SA pair was either requested or successfully negotiated) by the sum of the expiry time that was received with the 200 OK message at step 4 and a delta value. As a practical example, if UE 305 requested a registration at 10:00:00 a.m. (step 1), the P-CSCF returned an expiry of 3590 seconds at step 4, and the UE uses a delta of approximately 30 seconds, then the UE may calculate an expiration time for the SA at 11:30:30 a.m. (i.e., 10:00:00+3590 seconds+~30 seconds). Also at the UE side, the UE may calculate a re-registration time at which the UE will request a new SA pair. The UE may calculate a re-registration time, for example, by offsetting the registration time by a percentage of the received expiry time and a delta value. For example, if UE 305 requested a registration at 10:00:00 a.m. (step 1), the P-CSCF returned an expiry of 3590 seconds at step 4, the UE is configured to use a factor of 70 percent, and the UE uses a delta of approximately 30 seconds, then the UE may calculate re-registration time for the SA at 10:42:00 a.m. (i.e., 10:00:00+0.7*3590 seconds+~30 seconds).

At the P-CSCF, the system may calculate and store an expiration time for the SA pair based on an offset to a re-registration request and a delta delay. For example, P-CSCF 310 may calculate the SA pair to expire 90 seconds after the P-CSCF receives a second re-registration request. A person of ordinary skill will appreciate that any number of formulas may be used to calculate the re-registration time at the UE, or the expiration time for the SA pair at the UE or the P-CSCF. A person of ordinary skill will also recognize that the expiration times calculated by the UE and the P-CSCF may be the same or may be different.

At step 5, UE 305 send a re-registration request to P-CSCF 310 in order to request a new SA pair. UE 305 may send the re-registration request in response to the UE determining that the old SA pair has expired. In the present example, UE 305 sends the re-registration request at 10:42 because the UE calculated a re-registration time as 10:42:00 a.m. (i.e., 10:00:00+0.7*3590 seconds+~30 seconds), as explained above. At step 6, P-CSCF 310 sends an SIP 401 message towards UE 305 to challenge the initial re-registration request. Note that at steps 5 and 6, the communication between the UE 305 and P-CSCF 310 are protected under the original SA pair, SA-1. At step 7, UE 305 sends another SIP REGISTER request towards P-CSCF 310, this time containing information corresponding to a second security association pair (SA-2). At step 8, P-CSCF responds with a 200 OK message to confirm that the received security association pair (SA-2) has been successfully negotiated. As before, the 200 OK message may additionally include an expiry time that may be used to calculate an expiration time for SA-2.

At the UE side, the system may calculate an expiration time for SA-2 that offsets the re-registration time by the sum of the expiry time that was received with the 200 OK message at step 8 and a delta value. For example, if UE 305 requested a re-registration at 10:42:00 a.m. (step 5), the P-CSCF returned an expiry of 3590 seconds at step 8, and the UE uses a delta of approximately 30 seconds, then the UE may calculate an expiration time for SA-2 at 11:42:30 a.m. (i.e., 10:42:00+3590 seconds+~30 seconds). The UE may also calculate a re-registration time at which the UE will request a new SA pair (SA-3). The UE may calculate a re-registration time, for example, by offsetting the registration time by a percentage of the received expiry time and a delta value. For example, if UE 305 requested a registration at 10:42:00 a.m. (step 5), the P-CSCF returned an expiry of 3590 seconds at step 8, the UE is configured to use a factor of 70 percent, and the UE uses a delta of approximately 30 seconds, then the UE may calculate re-registration time for the SA at 11:42:23 a.m. (i.e., 10:42:00+0.7*3590 seconds+ ~30 seconds). At the P-CSCF, the system may calculate and store an expiration time for SA-2 based on an offset to a third re-registration request and a delta delay. For example, P-CSCF 310 may calculate SA-2 to expire 90 seconds after the P-CSCF receives a third re-registration request.

Each time a new SA pair is negotiated, the system may delete the previous SA pair from the UE and/or the P-CSCF. For example, after SA-2 is negotiated at steps 5-8, the system deletes SA-1 from P-CSCF. Subsequently, at step 9, the P-CSCF may receive an INVITE corresponding to an incoming call for UE 305. At step 10, P-CSCF 310 forwards the INVITE to UE 305 using the newly negotiated SA-2 pair. The incoming call is successfully connected at steps 11 and 12, when the UE sends notification of acceptance to the P-CSCF (step 11) and the P-CSCF sends notification of the acceptance to the call originator.

A person of ordinary skill in the art will appreciate that, by deleting SA-1 after SA-2 is negotiated, the system avoids the problem of attempting to forward the received INVITE request to the UE via SA-1. By contrast, if the system did not delete SA-1, a condition may occur when two SAs (i.e., SA-1 and SA-2) are stored in the system while the UE is configured only to send and receive messages via one SA (i.e., SA-2). Therefore, if the P-CSCF chooses the wrong SA (i.e., SA-1) to forward the INVITE request, the UE could erroneously reject the INVITE request because the UE is configured to communicate via SA-2 rather than SA-1. By deleting SA-1 after SA-2 is negotiated, the system eliminates the risk of failed communication due to using an incorrect security association.

CONCLUSION

The Figures and above description provide a brief, general description of a suitable environment in which the invention can be implemented. Although not required, aspects of the invention may be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices. Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/ or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112, sixth paragraph 112(f) (AIA), other aspects may likewise be embodied as a means-plus-function claim, or in other forms, such as being embodied in a computer-readable medium. (Any claims intended to be treated under 35 U.S.C. § 112, ¶6(f) will begin with the words "means for", but use of the term "for" in any other context is not intended to invoke treatment under 35 U.S.C. § 112, ¶6(f).) Accordingly, the applicant reserves the right to pursue additional claims after filing this application to pursue such additional claim forms, in either this application or in a continuing application.

We claim:

1. At least one non-transitory computer-readable memory, storing instructions, which when executed by at least one data processing device, manages security parameters that enable a device to receive Internet Protocol Multimedia Subsystem (IMS) services via a telecommunications network, the instructions comprising:
 receiving a registration request for the device to receive one or more IMS services via the telecommunications network;
 negotiating a first pair of security associations,
  wherein the first pair of security associations include a first expiration time;
 permitting access to an IMS service based at least in part on the first pair of security associations;
 receiving a re-registration request for the device to receive one or more IMS services via the telecommunications network;
 negotiating a second pair of security associations,
  wherein the second pair of security associations include a second expiration time;
 deleting the first pair of security associations; and
 permitting access to the IMS service or another IMS service based at least in part on the second pair of security associations.

2. The non-transitory computer-readable memory of claim 1, wherein the first and second pairs of security associations are stored on the mobile telecommunications network, wherein at least one requested IMS service is a voice call, and wherein the voice call is a Voice Over LTE (VoLTE) phone call.

3. The non-transitory computer-readable memory of claim 1, wherein deleting the first pair of security associations occurs in response to the first expiration time being reached.

4. The non-transitory computer-readable memory of claim 1, further comprising deleting the first pair of security associations in response to a pair of security associations being negotiated successfully.

5. The non-transitory computer-readable memory of claim 1, further comprising calculating a re-registration time while the device is being registered, and requesting re-registration of the device when the re-registration time is reached.

6. The non-transitory computer-readable memory of claim 1, wherein the first or second expiration time is based on an expiry time and a delta delay, and wherein the first or second expiry time is received while the device is being registered or re-registered, respectively.

7. The non-transitory computer-readable memory of claim 1, further comprising deleting the first pair of security associations in response to negotiating a subsequent set of security associations or in response to the first expiration time being reached for the first pair of security associations.

8. An apparatus for use in a telecommunications network to manage security parameters for a mobile device to access network services, the apparatus comprising:
 at least one processor;
 at least one memory coupled to the processor and storing instructions to be executed by the at least one processor, the instructions comprising—
  registering the mobile device to receive at least one Internet Protocol Multimedia Subsystem (IMS) service via the network,
   wherein the registering includes negotiating a first security association that enables the mobile device to receive the at least one IMS service, and
   wherein the first security association includes a first expiration time after which the first security association is no longer valid;
  re-registering the mobile device to receive the at least one IMS service via the telecommunications network,
   wherein the re-registering includes negotiating a second security association that enables the mobile device to receive the at least one IMS service, and wherein the second security association includes a second expiration time after which the second security association is no longer valid; and after negotiating the second security association, deleting the first security association.

9. The apparatus of claim 8, wherein the first and second security associations are stored on the telecommunications network, wherein at least one requested IMS service is a voice call, and wherein the voice call is a Voice Over LTE (VoLTE) phone call.

10. The apparatus of claim 8, wherein deleting the first security association occurs in response to the first expiration time being reached.

11. The apparatus of claim 8, further comprising deleting the first security association in response to a pair of security associations being negotiated successfully.

12. The apparatus of claim 8, further comprising calculating a re-registration time while the device is being registered, and requesting re-registration of the device when the re-registration time is reached.

13. The apparatus of claim 8, wherein the first expiration time is based on an expiry time and a delta delay, and wherein the first or second expiry time is received while the device is being registered or re-registered, respectively.

14. The apparatus of claim 8, further comprising deleting the first security association in response to negotiating a subsequent set of security associations or in response to the first expiration time being reached for the first security association.

15. A method for use in an Internet Protocol Multimedia Subsystem (IMS) network to manage security parameters for a mobile device to access services, the method comprising:

registering the mobile device to receive at least one IMS service via the IMS network,
wherein the registering includes negotiating a first security association that enables the mobile device to receive the at least one IMS service, and
wherein the first security association includes a first expiration time after which the first security association is no longer valid;

re-registering the mobile device to receive the at least one IMS service via the IMS network,
wherein the re-registering includes negotiating a second security association that enables the mobile device to receive the at least one IMS service, and
wherein the second security association includes a second expiration time after which the second security association is no longer valid; and after negotiating the second security association, causing the first security association to no longer be valid.

16. The method of claim 15, wherein the first and second security associations are stored on the IMS network, wherein at least one requested IMS service is a voice call, and wherein the voice call is a Voice Over LTE (VoLTE) phone call.

17. The method of claim 15, wherein the first security association becomes no longer valid in response to the first expiration time being reached.

18. The method of claim 15, further comprising deleting the first security association in response to a pair of security associations being negotiated successfully.

19. The method of claim 15, further comprising calculating a re-registration time while the device is being registered, and requesting re-registration of the device when the re-registration time is reached.

20. The method of claim 15, wherein the first expiration time is based on an expiry time and a delta delay, and wherein the first or second expiry time is received while the device is being registered or re-registered, respectively.

21. The method of claim 15, further comprising deleting the first security association in response to negotiating a subsequent set of security associations or in response to the first expiration time being reached for the first security association.

* * * * *